(12) United States Patent
Gillot et al.

(10) Patent No.: US 8,114,542 B2
(45) Date of Patent: Feb. 14, 2012

(54) METHOD FOR PRODUCTION OF AN ANODE FOR A LITHIUM-ION BATTERY

(75) Inventors: Frederic Gillot, Amiens (FR);
Jean-Marie Tarascon, Menneoy (FR);
Laure Monconduit, Jacou (FR)

(73) Assignee: Centre National de la Recherche Scientifique, Paris (FR)

( * ) Notice: Subject to any disclaimer, the term of this patent is extended or adjusted under 35 U.S.C. 154(b) by 443 days.

(21) Appl. No.: 11/920,625

(22) PCT Filed: May 16, 2006

(86) PCT No.: PCT/FR2006/001100
§ 371 (c)(1),
(2), (4) Date: Jun. 1, 2009

(87) PCT Pub. No.: WO2006/123050
PCT Pub. Date: Nov. 23, 2006

(65) Prior Publication Data
US 2009/0286156 A1   Nov. 19, 2009

(30) Foreign Application Priority Data

May 18, 2005   (FR) .................................... 05 04961

(51) Int. Cl.
*H01M 4/02* (2006.01)
*H01M 4/13* (2006.01)
*H01M 4/58* (2006.01)
*H01M 4/66* (2006.01)
*C01B 25/08* (2006.01)
*H01B 1/06* (2006.01)

(52) U.S. Cl. .................. 429/218.1; 429/220; 429/221; 429/223; 429/231.5; 429/245; 423/305; 423/322; 252/521.6; 29/623.5

(58) Field of Classification Search .................. 429/207, 429/127, 194, 192, 235, 345, 221, 223, 231.5, 429/220; 204/192; 252/521.6; 423/305, 423/322
See application file for complete search history.

(56) References Cited

U.S. PATENT DOCUMENTS 4,092,464 A * 5/1978 Dey et al. ...................... 429/127
(Continued)

FOREIGN PATENT DOCUMENTS
JP    2001110425    4/2001
(Continued)

OTHER PUBLICATIONS

Bachhofer et al., "Phase formation and crystal growth of Sr-Bi-Ta-O thin films grown bu metalorganic chemical vapor deposition", J. Material Research, vol. 16, No. 10, Oct. 2001.*

(Continued)

*Primary Examiner* — Jonathan Crepeau
*Assistant Examiner* — Kenneth Douyette
(74) *Attorney, Agent, or Firm* — Merchant & Gould (57) ABSTRACT

The invention relates to a method for producing an anode for a lithium-ion battery, said anode comprising a current collector formed from a transition metal M in the form of a foam and an active material comprising a binary phosphide of said metal M, said active material corresponding to the formula $MP_x$ in which $1 \leq x \leq 4$. The method consists in subjecting the metal M foam to the action of phosphorus vapor at a temperature between 300° C. and 600° C., the phosphorus being present in a proportion which differs by at most 10% from the stoichiometric proportion relative to the metal M.
The invention also relates to an anode for a lithium-ion battery, and to a lithium-ion battery comprising such an anode.

18 Claims, 12 Drawing Sheets

U.S. PATENT DOCUMENTS

| | | | |
|---|---|---|---|
| 4,508,608 A | | 4/1985 | Palmer |
| 5,455,126 A | * | 10/1995 | Bates et al. ................... 429/127 |
| 2005/0106467 A1 | * | 5/2005 | Hambitzer et al. ........... 429/235 |

FOREIGN PATENT DOCUMENTS

| | | |
|---|---|---|
| WO | WO03/058732 | 7/2003 |
| WO | WO-03061036 A * | 7/2003 |
| WO | WO2006/123050 | 11/2006 |

OTHER PUBLICATIONS

"Red Phosphorus", MSDS, Cerac, Inc., Milwaukee, WI, retrieved online on Nov. 18, 2010 from http://www.cerac.com.*

F. Gillot, "Electrochemical Reactivity and Design of $NiP_2$ Negative Electrodes for Secondary Li-Ion Batteries"; Chemistry of Materials, American Chemical Society, Washington, DC; vol. 17; No. 1, pp. 6327-6337; Aug. 11, 2005.

International Search Report dated Aug. 31, 2006.

* cited by examiner

METHOD FOR PRODUCTION OF AN ANODE FOR A LITHIUM-ION BATTERY

The invention relates to a method for producing an anode for a lithium-ion battery, as well as to an anode for said battery and to a lithium-ion battery comprising such an anode.

BACKGROUND OF THE INVENTION

Lithium-ion batteries operate by reversible insertion of lithium ions between a negative electrode (or anode) and a positive electrode (or cathode). At the anode, the lithium-ion technology requires the use of an active material which may be reduced to very low potentials with respect to lithium. It is known that carbon meets this criterion.

However, such systems have limited mass and volume capacities. It has therefore proved necessary to find alternatives to the use of carbon.

For this purpose, it has been proposed to use transition metal phosphides as active material for an anode. The intrinsic properties of these materials make them particularly advantageous for the solid insertion of lithium. This is because, the degree of oxidation of the phosphorus may vary from +5 in its most oxidized form to −3 in its most reduced form. Phosphorus forms phosphorus-phosphorus bonds and metal-phosphorus bonds of covalent nature with most of the transition metals, these bonds being easily deformable depending on the supply or withdrawal of electrons via the insertion/extraction of lithium.

For example, WO 03/058732 describes the use of binary transition metal phosphides such as $FeP_2$, $CoP_3$ and $MnP_4$ as active materials for an anode. Depending on the method for manufacturing the anode described in this document, the active material is first produced by the ceramic route. This active material is combined with a binder and with carbon particles to form a paste. This paste is then applied to the current collector composed of a nonporous metal foil. However, the anode obtained by such a method has a limited cycling performance and low kinetics, which makes its use not very realistic in a lithium-ion battery. Moreover, this material may rapidly lose its cycling capacity in the absence of carbon additives, or when the layer deposited on the current collector is too thick. Furthermore, the deposition on the current collector of a composite material based on phosphide and carbon may be rendered difficult due to adhesion problems. These drawbacks would pose additional problems in the hypothesis of a method carried out on an industrial scale.

Electrodes used in aqueous batteries of Ni—Cd or Ni—MeH type are also known, said electrodes being formed from nickel foam. In these electrodes, the foams are simply impregnated with active material $Ni(OH)_2$ and, consequently, the $Ni/Ni(OH)_2$ interface between the foam and the active material is purely physical. The quality of such an interface is not sufficient for an anode of a lithium-ion battery.

SUMMARY OF THE INVENTION

To overcome these drawbacks, the invention provides a method for producing an anode for a lithium-ion battery which consists in producing the active material directly on the current collector, so as to obtain a chemical interface between the current collector and the active material.

Thus, according to a first aspect, the invention provides a method for producing an anode for a lithium-ion battery, said anode comprising a current collector formed from a transition metal M in the form of a foam and an active material comprising a binary phosphide of said metal M, said active material corresponding to the formula $MP_x$ in which $1 \leq x \leq 4$. The method consists in subjecting the metal M foam to the action of phosphorus vapor at a temperature between 300° C. and 600° C., the phosphorus being present in a proportion which differs by at most 10% from the stoichiometric proportion relative to the metal M. The foam may be in the form of a lamina having open porosity. The fact of using a foam has the advantage of enabling a rapid reaction between the metal M and the phosphorus, and of resulting in a uniform deposition of the layer of metal M phosphide. These advantages result from the fact that the foam has, due to its porous structure, a large contact area capable of reacting with the phosphorus. The pores of the foam are open and have a diameter of around 100 to 200 microns. The phosphorus vapor may thus spread throughout the interior of the metal foam. Moreover, the structure of the foam, when it is covered with metal M phosphide, makes it possible to increase the specific surface area of the active material available for the reaction with lithium.

The reaction of phosphorus with the metal M foam makes it possible to make the metal M phosphide grow on the surface of the pores of the foam. Thus a metal M foam is obtained whose pores are covered, over their entire surface, with a layer of metal M phosphide. The thickness of the phosphide layer depends on the reaction temperature and time conditions. By choosing a sufficiently long reaction time, it is possible to obtain a foam whose pores are completely impregnated with phosphide. This possibility of controlling the thickness of the layer, added to the quality of the active material/current collector interface, further improves the performance of the anode obtained.

DETAILED DESCRIPTION OF THE PREFERRED EMBODIMENTS

According to one embodiment, the phosphorus is present in proportions such that the active material formed corresponds to the formula $MP_2$.

The reaction between the metal M foam and the phosphorus is preferably carried out for a duration between 6 and 120 hours.

This reaction may take place under an inert gas, such as argon. It may also advantageously take place under vacuum, which makes it possible to be free from phosphorus vapor overpressures.

The transition metal M may be nickel, copper, vanadium, titanium or iron.

Figure 1:
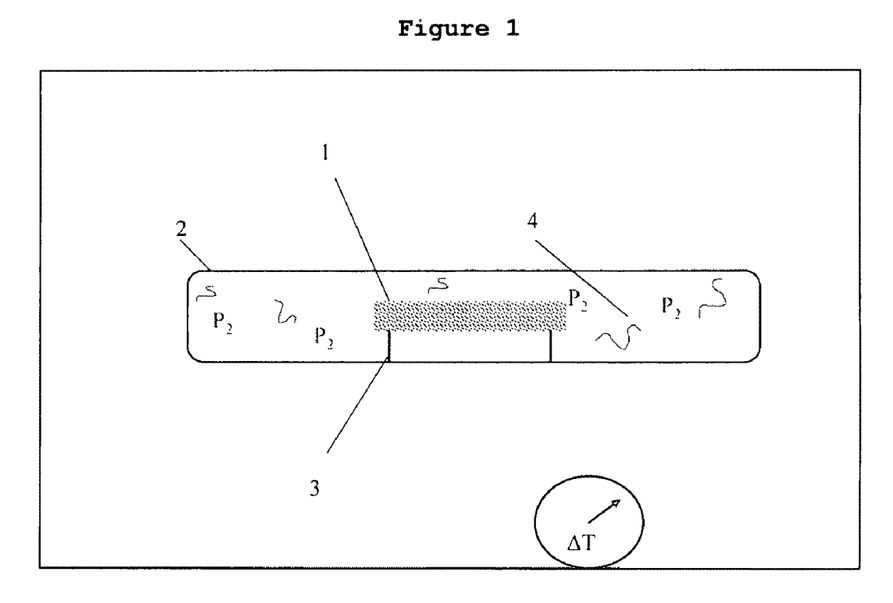
FIG. 1 represents schematically production of an anode according to the invention in the following manner: a foam 1 of metal M is placed in a vial 2, such as a silica tube, sealed under a vacuum of $10^{-2}$ torr, by means of a support 3, for example made of silica.

As represented schematically in FIG. 1, an anode according to the invention may be produced in the following manner: a foam 1 of metal M is placed in a vial 2, such as a silica tube, sealed under a vacuum of $10^{-2}$ torr, by means of a support 3, for example made of silica. The foam 1 is subjected to the action of phosphorus vapor 4. For this, red phosphorus is introduced into the vial in stoichiometric proportions with respect to the metal used, or in proportions differing by plus or minus 10% with respect to the stoichiometry. Then the vial is heated to a temperature between 300° C. and 600° C., so as to sublime the phosphorus. The reaction time, typically between 6 and 120 hours, conditions the amount of metal phosphide which forms, as is illustrated in Example 3 below.

According to a second aspect, a subject of the invention is an anode for a lithium-ion battery, comprising a current collector and an active material.

This anode is characterized in that the current collector is made up of a transition metal M foam, and the active material is a binary phosphide of the metal M impregnating the foam, which corresponds to the formula $MP_x$ in which $1 \leq x \leq 4$.

According to one embodiment, the active material corresponds to the formula $MP_2$.

According to one particular embodiment, the current collector is a nickel foam.

According to another embodiment, the current collector is a copper foam.

The current collector may also be a vanadium foam or a titanium foam or an iron foam.

According to a third aspect, a subject of the invention is a lithium-ion battery comprising an anode such as defined previously, a cathode comprising a lithiated material as an active material, and an electrolyte comprising a lithium salt and a solvent or a mixture of solvents.

The active material of the cathode is chosen, for example, from $LiFePO_4$, $LiNiO_2$, $LiCoO_2$, $Li_2MnO_4$, vanadium oxides $VO_x$ ($2 \leq x \leq 2.5$), $LiV_3O_8$, $Li_yNi_{1-x}Co_xO_2$, ($0 \leq x \leq 1$; $0 \leq y \leq 1$), manganese spinels $Li_yMn_{1-x}M_xO_2$ (M=Cr, Al, V, Ni, $0 \leq x \leq 0.5$; $0 \leq y \leq 2$), organic polydisulfides, FeS, $FeS_2$, iron sulfate $Fe_2(SO_4)_3$, phosphates and phosphosilicates of iron and lithium of olivine structure, or their products of substitution of the iron with manganese, used alone or as mixtures.

The electrolyte solvent is preferably chosen from aprotic liquids such as, for example, linear ethers and cyclic ethers, esters, nitriles, nitro derivatives, amides, sulfones, sulfolanes, alkylsulfamides and partially halogenated hydrocarbons. Particularly preferred solvents are diethyl ether, dimethoxyethane, glyme, tetrahydrofuran, dioxane, dimethyltetrahydrofuran, methyl or ethyl formate, propylene carbonate or ethylene carbonate (EC), alkyl carbonates (especially dimethyl carbonate (DMC), diethyl carbonate and methyl propyl carbonate), butyrolactones, acetonitrile, benzonitrile, nitromethane, nitrobenzene, dimethylformamide, diethylformamide, N-methylpyrrolidone, dimethyl sulfone, tetramethylene sulfone and tetraalkyl-sulfonamides having from 5 to 10 carbon atoms. A mixture of two or more of these liquids may be used, especially an EC/DMC mixture.

The lithium salt of the electrolyte may be an ionic compound $Li^+Y^-$, in which $Y^-$ represents an anion with a delocalized electronic charge, for example $Br^-$, $ClO_4^-$, $PF_6^-$, $AsF_6^-$, $R_FSO_3^-$, $(R_FSO_2)_2N^-$, $(R_FSO_2)_3C^-$, $C_6H_{(6-x)}(CO(CF_3SO_2)_2C^-)_x$ or $C_6H_{(6-x)}(SO_2(CF_3SO_2)_2C^-)_x$, $R_F$ representing a perfluoroalkyl or perfluoroaryl group, with $1 \leq x \leq 4$. The preferred ionic compounds are lithium salts, and more particularly $(CF_3SO_2)_2N^-Li^+$, $CF_3SO_3^-Li^+$, $C_6H_{(6-x)}^-[CO(CF_3SO_2)_2C^-Li^+]_x$ compounds in which x is between 1 and 4, preferably with x=1 or 2, $C_6H_{(6-x)}^-[SO_2(CF_3SO_2)_2C^-Li^+]_x$ compounds in which x is between 1 and 4, preferably with x=1 or 2. Mixtures of these salts together or with other salts may be used. By way of example of mixtures of salts, mention may be made of: $(CF_3SO_2)_2N^-Li^+$ and $CF_3SO_3^-Li^+$ or $(CF_3SO_2)_2N^-Li^+$ and $C_6H_4^-[CO(CF_3SO_2)_2C^-Li^+]_2$ in various proportions, but preferably comprising from 20 to 40% by weight of $(CF_3SO_2)_2N^-Li^+$.

The method of the invention makes it possible to obtain an anode having a substantially improved cycling performance with respect to that of the anodes of the prior art. This results from the fact that there is a continuous solution between the active material and the current collector, which leads to optimization of the active material/current collector interface and consequently better electronic conductivity. It is therefore not necessary to mix carbon (electrochemically inactive material) with the active material to improve the electronic conductivity thereof.

Moreover, the production of the battery is simplified due to the fact that the synthesis of the active material and the production of the anode are carried out in a single step.

Furthermore, the anode formed and also the starting compounds are nontoxic and are stable in air and in water, which satisfactorily meets the constraints imposed by the industry.

The present invention is illustrated by the concrete exemplary embodiments described below, to which it is not however limited.

All the samples were produced in a device and according to the method described above. The electrochemical measurements presented below were carried out in a conventional Swagelok-type cell. These measurements were carried out in a laboratory, in a Li-metal configuration cell, the reference electrode being a lithium electrode, the working electrode being an electrode comprising the metal M foam impregnated by the phosphide of the metal M. In this case, the metal foam element operated as a cathode, and the lithium reference electrode as an anode. The two electrodes were separated by a separator comprising several glass fiber layers soaked with electrolyte. The electrolyte was $LiPF_6$ in a mixture of ethylene carbonate (EC) and dimethyl carbonate (DMC) in an EC/DMC weight ratio of 1/1. All the galvanostatic measurements were carried out in one Li/10 hours, that is to say that the current imposed on the battery corresponded to the insertion of one $Li^+$ ion in the metal phosphide mesh over 10 hours.

Figure 2:
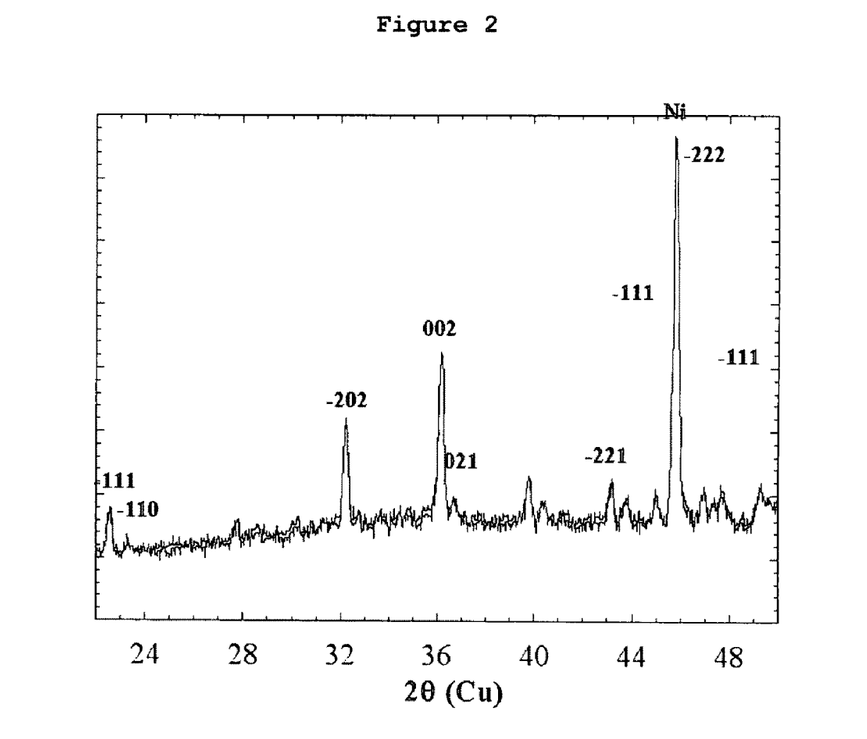
FIG. 2 represents the X-ray diffraction pattern obtained for the material of Example 1.
Figure 6:
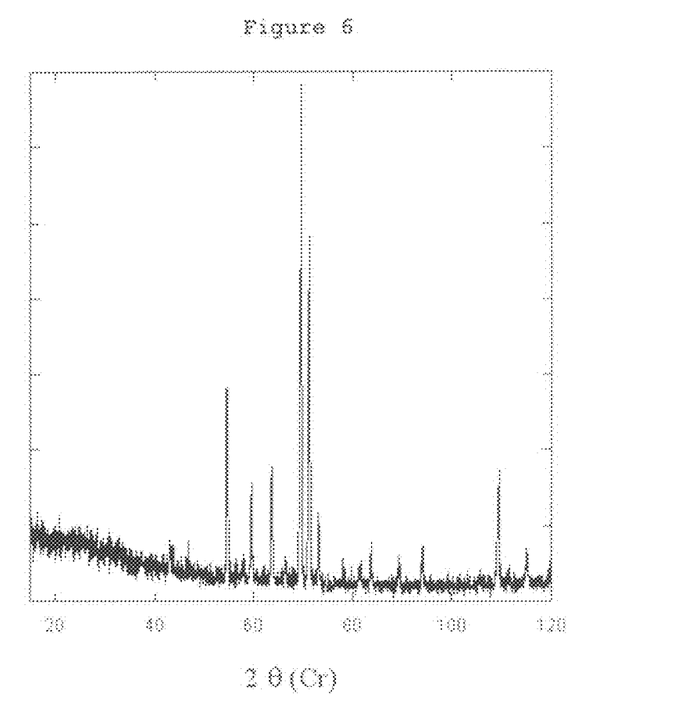
FIG. 6 represents the X-ray diffraction pattern obtained for the material composed of the impregnated foam(Cr wavelength).
Figure 7A:
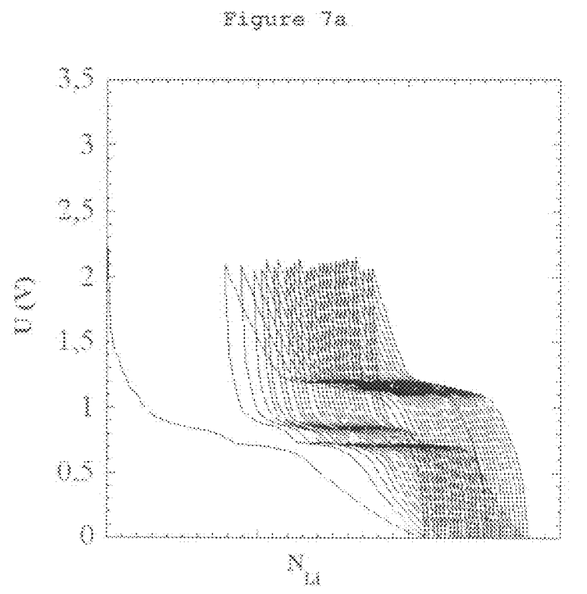
FIG. 7a illustrates the galvanostatic measurement corresponding to this sample, which represents the potential U, in volts, as a function of the number of $Li^+$ ions inserted ($N_{Li}$).
Figure 7B:
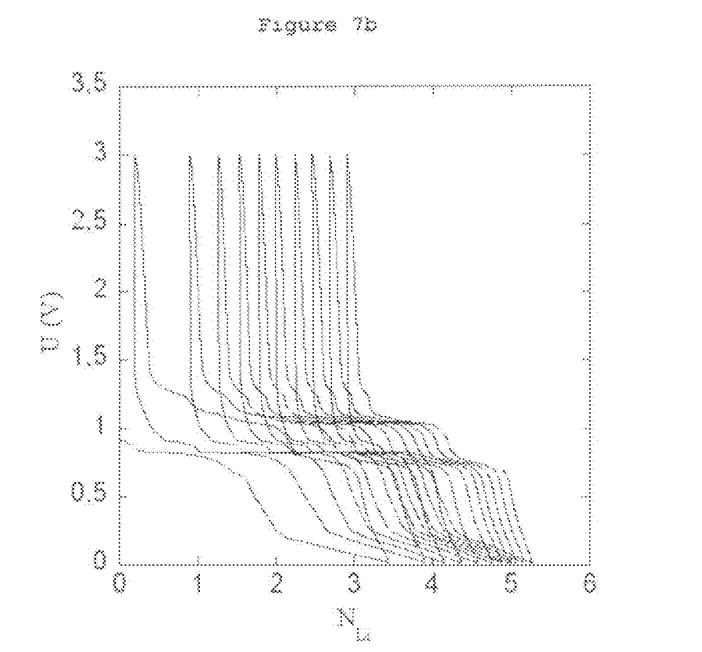
FIG. 7b provides a comparison for these results with a galvanostatic measurement carried out on a $Cu_3P$ powder produced by the ceramic route at 600° C.
Figure 8A:
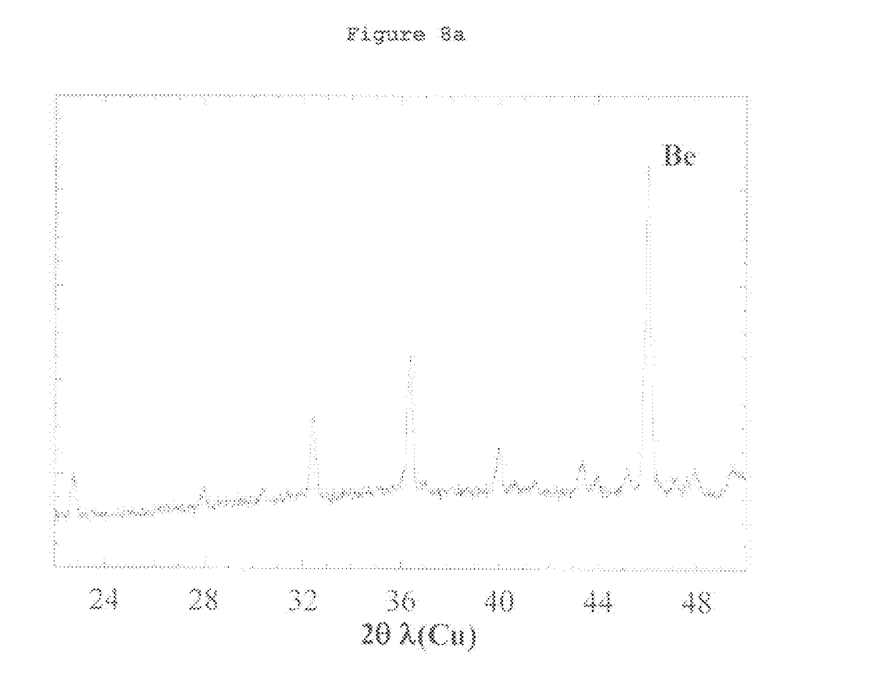
FIG. 8a represents the X-ray diffraction pattern for the material of Example 6.
Figure 8B:
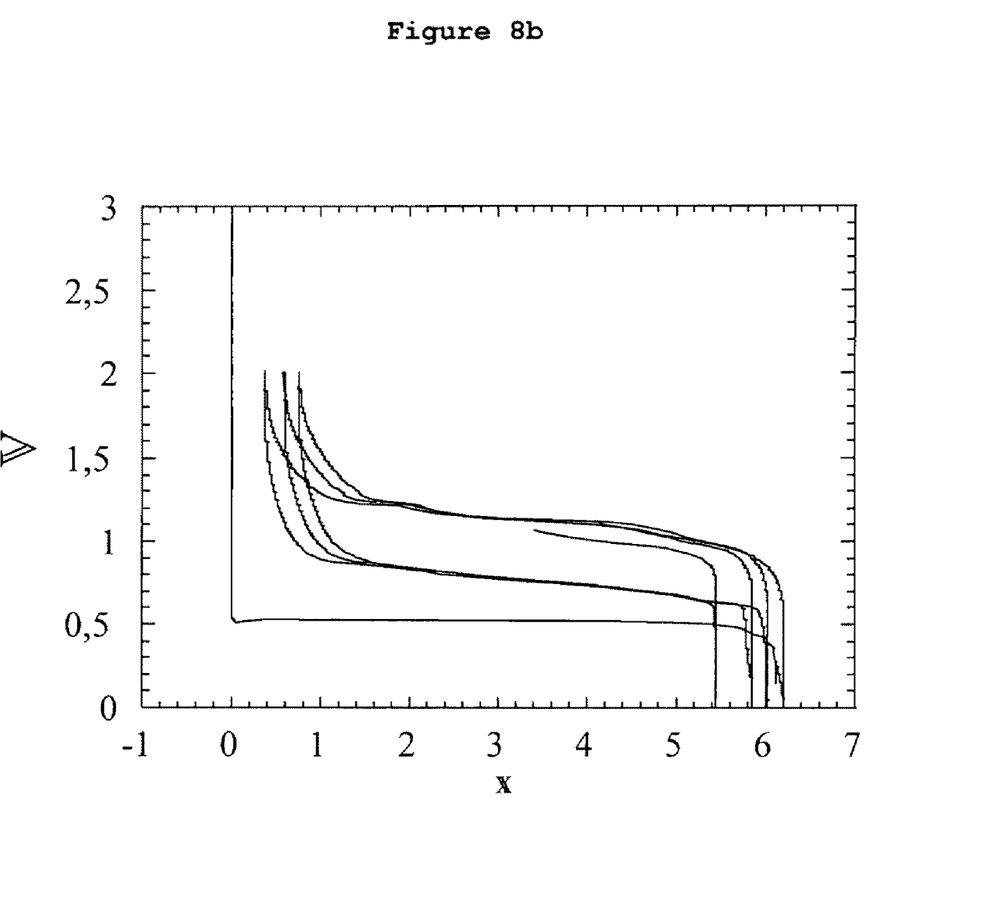
FIG. 8b shows the electrochemical behavior of the Ni foam impregnated by the nickel triphosphide of Example 6.

Examples 1 to 4 illustrate the characterization of electrodes consisting of $NiP_2$ on a nickel foam, with reference to FIGS. 2 to 4, Example 5 illustrates the characterization of an electrode consisting of $CuP_2$ on a copper foam, with reference to FIGS. 6 and 7, and Example 6 illustrates the characterization of an electrode consisting of $NiP_3$ on a nickel foam, with reference to FIGS. 8a and 8b.

EXAMPLE 1

The impregnation of the nickel foam by nickel phosphide was carried out in the device described above starting from a nickel foam (sold by Recemat under the reference RCM-Ni-4852.016) the thickness of which was around 1 mm, and the pores of which had a diameter of around 100 to 200 μm and a volume of around $10^{-4}$ to $10^{-3}$ mm$^3$. The pores represented around 95% of the total volume of the foam, which leads to a very high specific surface area and good rigidity and hardness of the foam. The density of the nickel foam was around 0.4 to 0.5 g/cm$^3$.

The reaction was carried out at a temperature of 600° C. for 120 hours, using an amount of phosphorus corresponding to the stoichiometry of the $NiP_2$ compound.

The X-ray diffraction pattern obtained for the material consisting of the impregnated foam is represented in FIG. 2. It shows that the nickel phosphide formed on the foam is a diphosphide $NiP_2$ of monoclinic structure, having the following parameters:

a=6.366 Å; b=5.615 Å; c=6.072 Å; β=126.2; C2/c.

EXAMPLE 2

The procedure from Example 1 was repeated to form a material consisting of nickel diphosphide $NiP_2$ on a nickel foam. The reaction was carried out at 350° C. for 12 hours.

FIGS. 3a to 3d present transmission electron microscopy images taken on the material obtained, the images corresponding to magnifications of ×500, ×2000, ×6000 and ×12000 respectively.

Figure 3A:
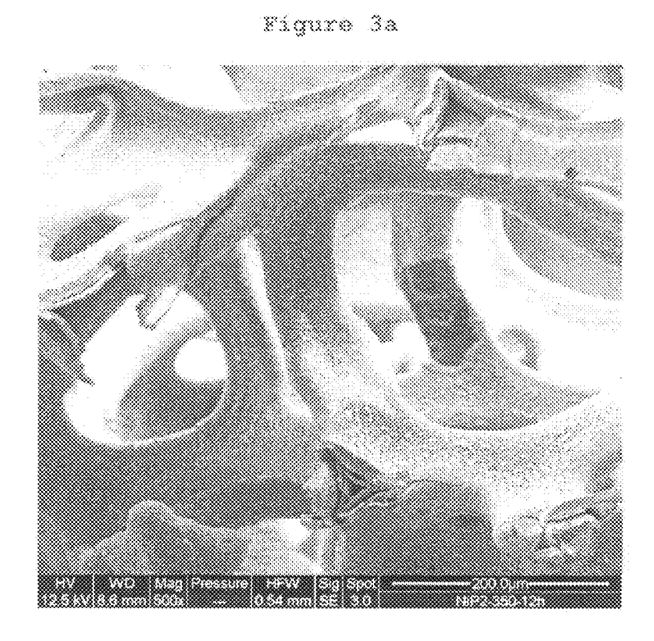
FIG. 3a to 3d present transmission electron microscopy images taken on the material obtained according to Example 2, the images corresponding to magnifications of ×500, ×2000, ×6000 and ×12000 respectively.

FIG. 3a shows the shape of the pores of the nickel foam covered with $NiP_2$, the average diameter of these pores being 200 microns.

Figure 3B:
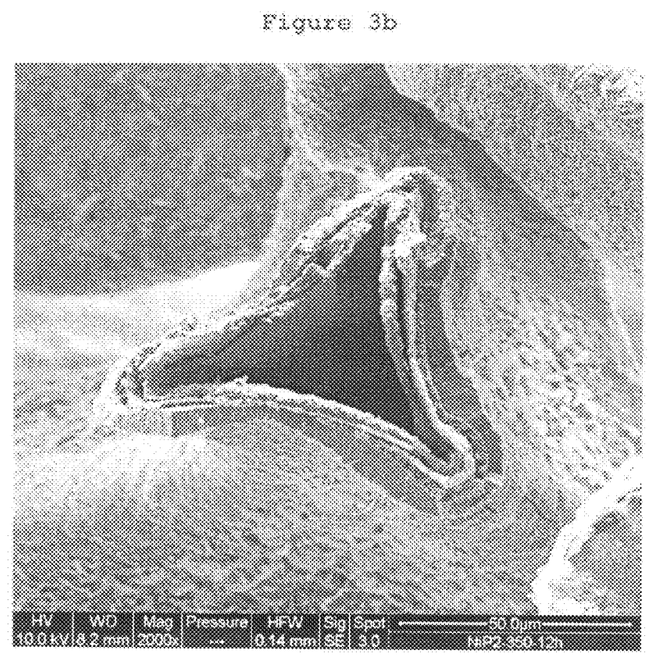

FIG. 3b shows the thickness of the $NiP_2$ layer, between 5 and 10 microns.

Figure 3C:
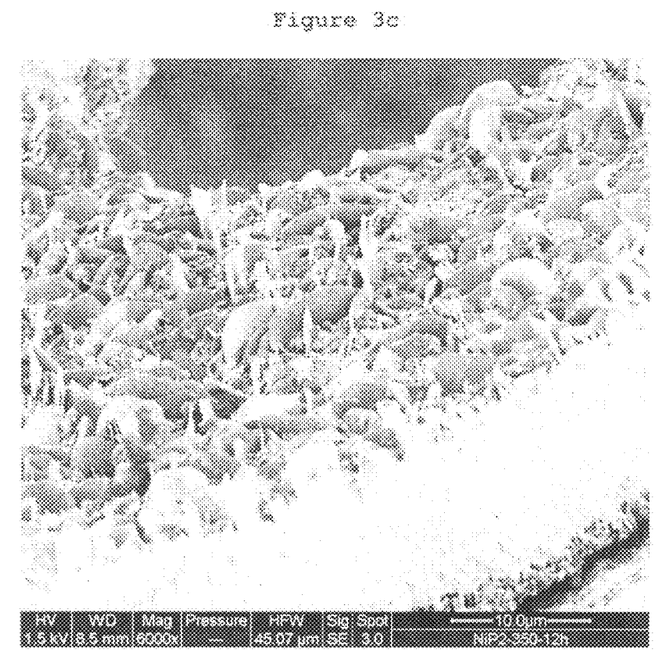
Figure 3D:
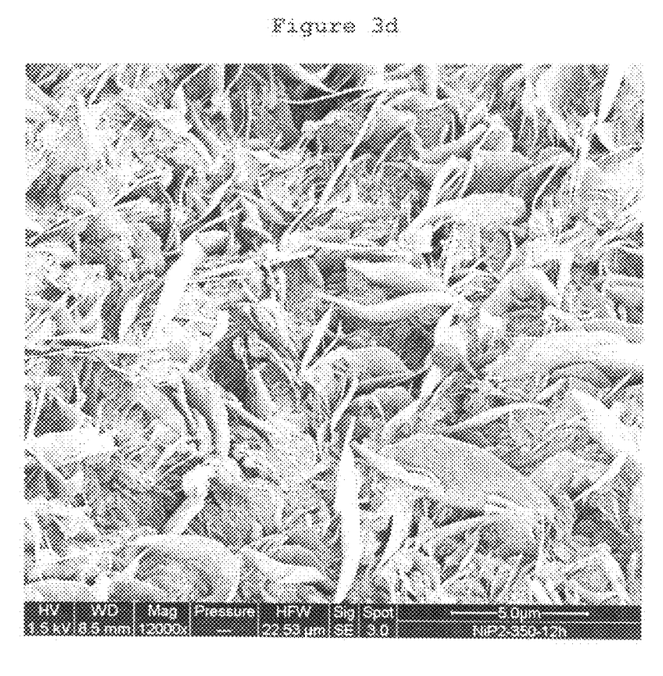

FIGS. 3c and 3d reveal that the structure of the $NiP_2$ layer is very lamellar, which helps to increase the surface area available for reaction with lithium. The thickness of the laminae is around a few tens of nanometers.

EXAMPLE 3

FIGS. 4a to 4d each represent several transmission electron microscopy images taken on a material consisting of $NiP_2$ on a nickel foam, obtained according to the procedure from Example 2. The reaction was carried out at 350° C. for durations of 2, 6, 12 and 120 hours respectively.

Each figure also represents the corresponding galvanostatic curve. Each of these curves represents the potential U (in volts) as a function of the number of Li$^+$ ions inserted ($N_{Li}$).

Figure 4A:
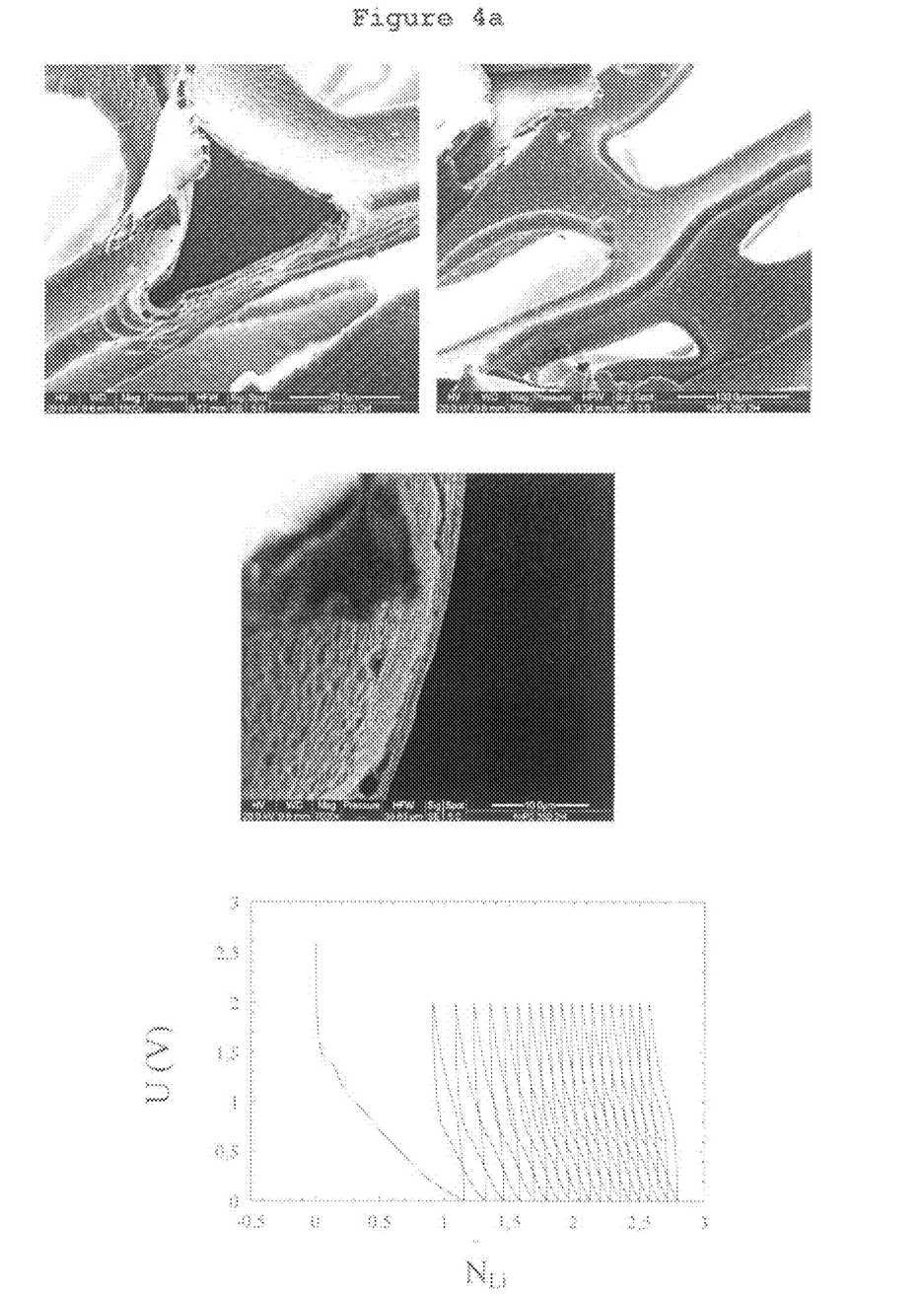
FIGS. 4a to 4d each represent several transmission electron microscopy images taken on a material consisting of $NiP_2$ on a nickel foam, obtained according to the procedure from Example 2.
Figure 4B:
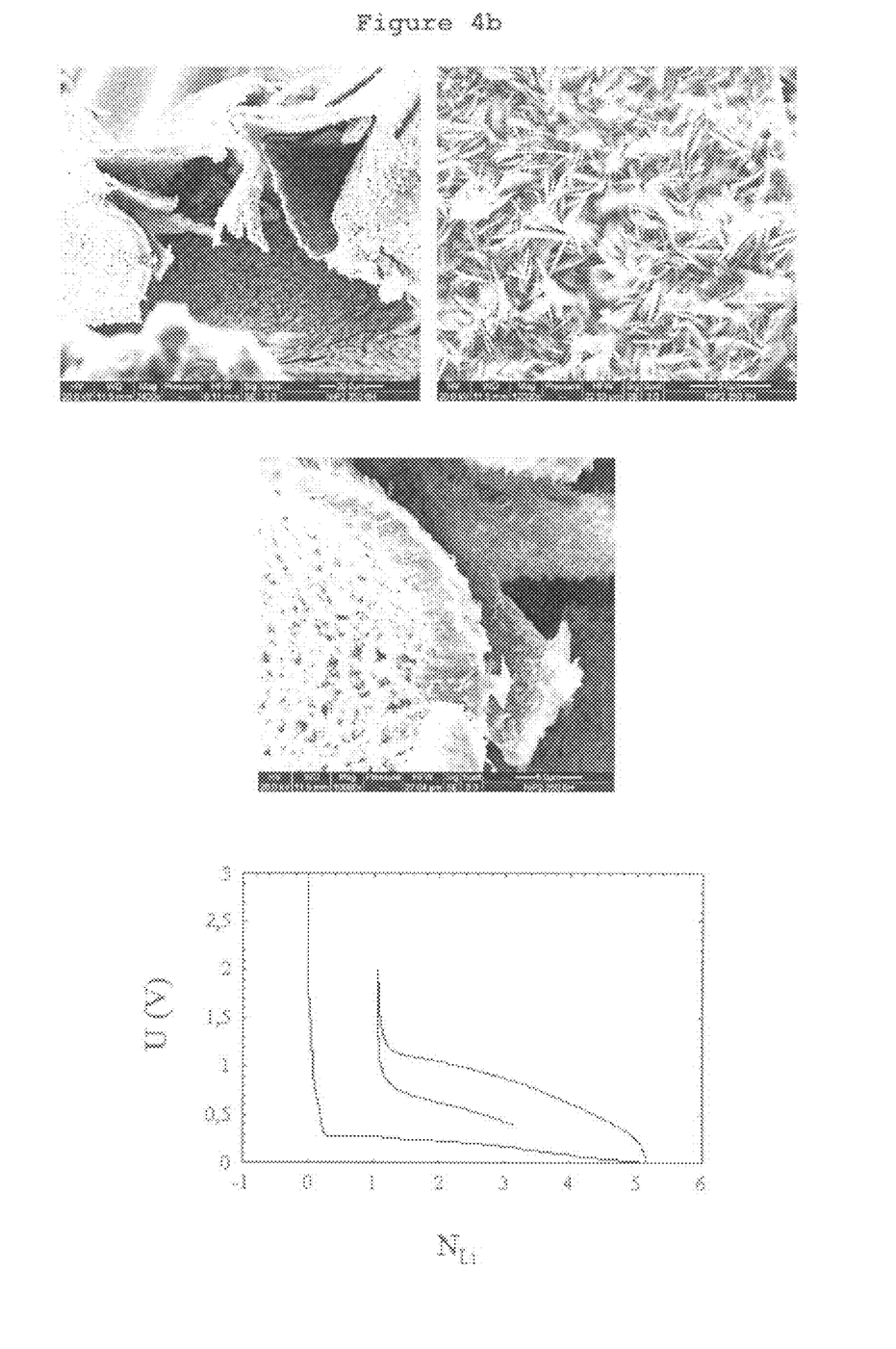
Figure 4C:
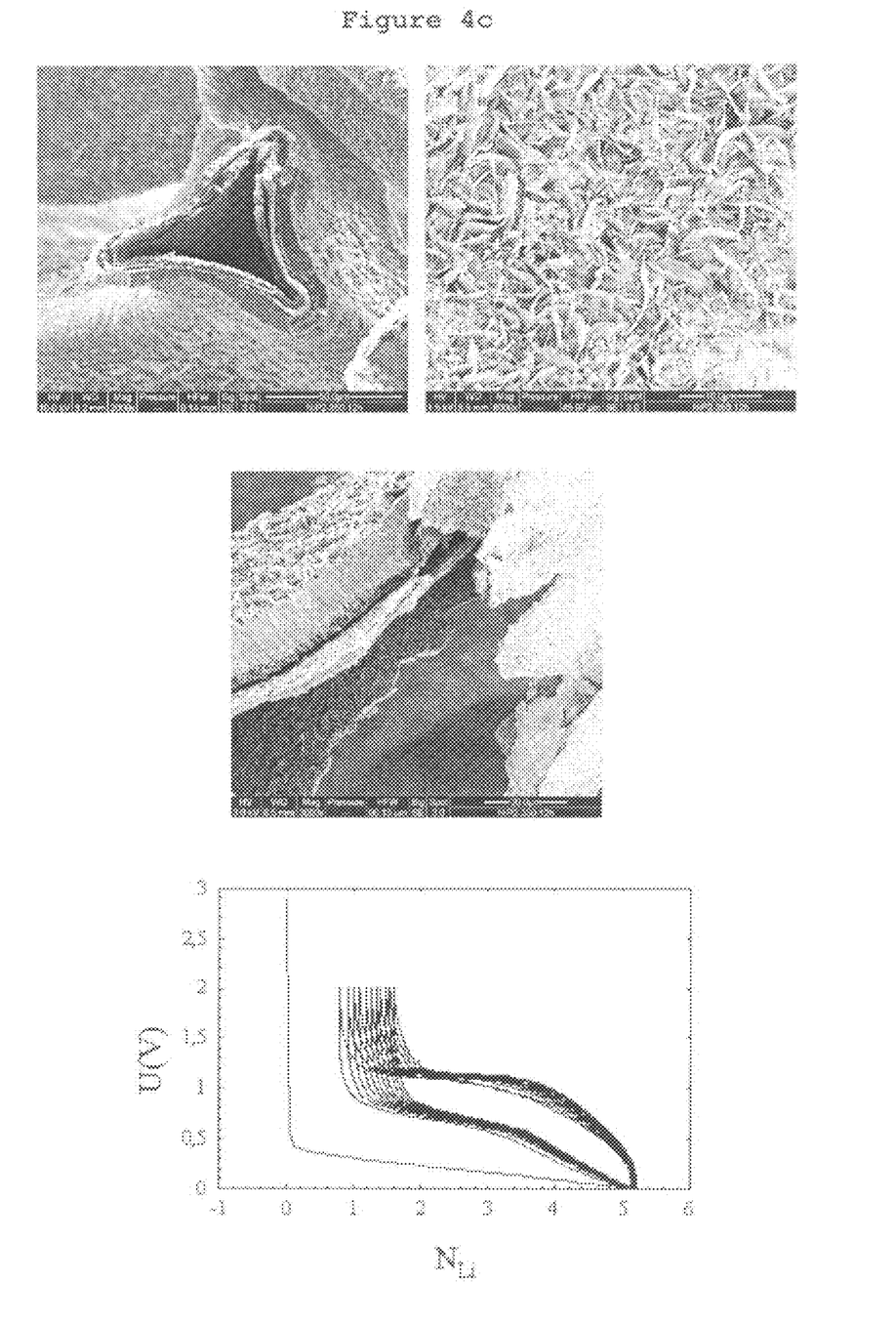

From the images from FIG. 4a, it appears that, at the end of 2 hours of contact between the nickel foam and the phosphorus, the phosphidization reaction has not started, as the $NiP_2$ phase does not appear. The corresponding galvanostatic curve shows that the insertion of lithium is low and irreversible, different from that expected for $NiP_2$. The images from FIGS. 4b and 4c show that after reacting for 6 hours, an $NiP_2$ layer with a thickness equal to 3 microns appears and that, after reacting for 12 hours, the layer achieves a thickness of 10 microns. The corresponding galvanostatic curves show a reversible insertion of 5.1 Li$^+$ ions after reacting for 6 hours and of 5.3 Li$^+$ ions after reacting for 12 hours.

Figure 4D:
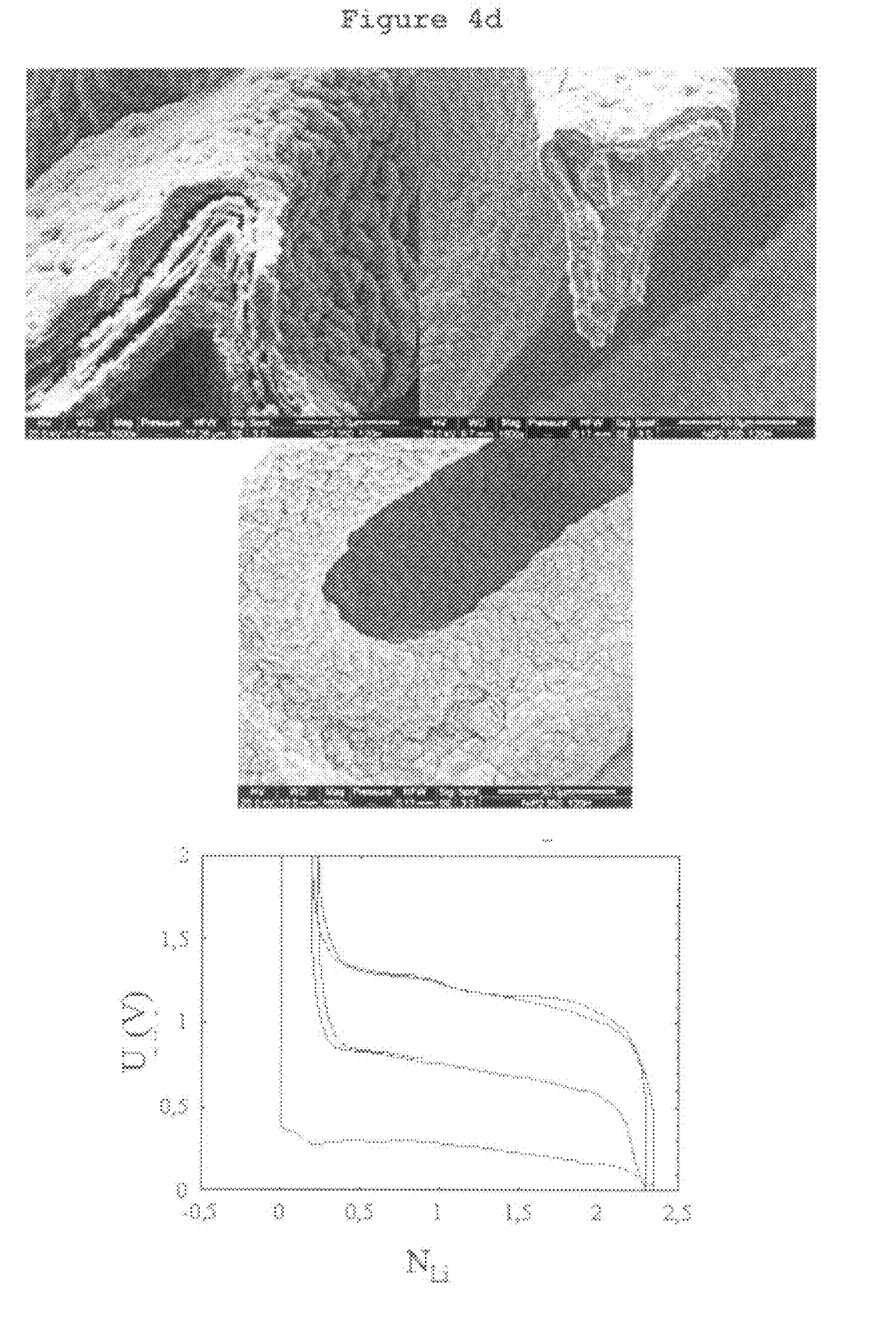

The images from FIG. 4d show that after 120 hours the reaction is complete as the nickel foam has disappeared, almost all of the nickel being converted to $NiP_2$. The $NiP_2$ surface is amorphized (thickness of 20 to 50 microns) and the galvanostatic curve shows a reversible insertion of 2 lithium atoms.

From these results, it appears that the 6-hour and 12-hour protocols at 350° C. make it possible to obtain maximum lithium insertion performance and to maintain the capacity as a function of the cycles.

EXAMPLE 4

Figure 5A:
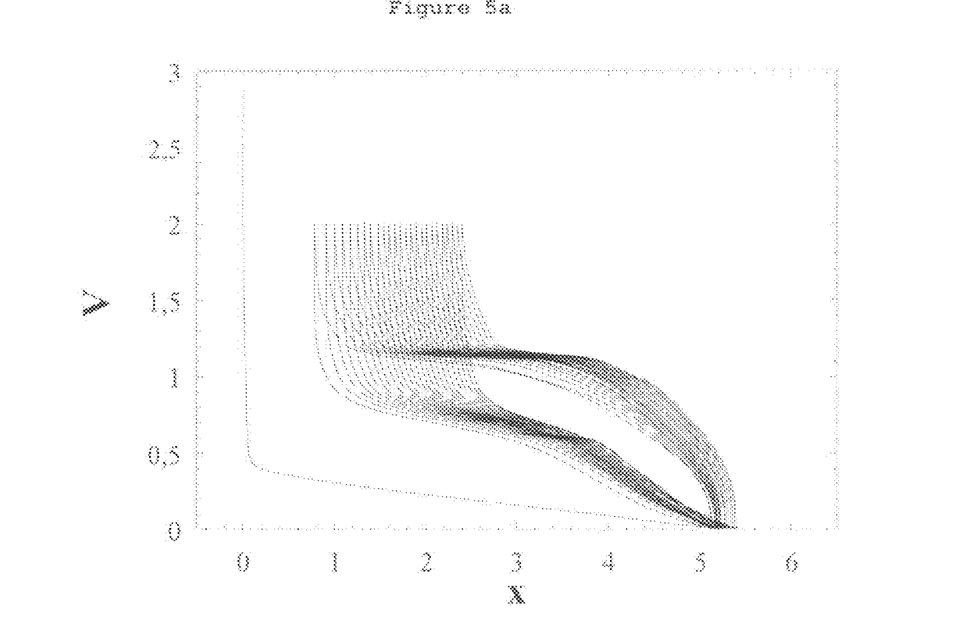
FIGS. 5a to 5d make it possible to compare the performances between an electrode according to the invention consisting of $NiP_2$ on a nickel foam (FIGS. 5a and 5c) and a $NiP_2$ phase in powder form produced by mechanosynthesis (FIGS. 5b and 5d).
Figure 5B:
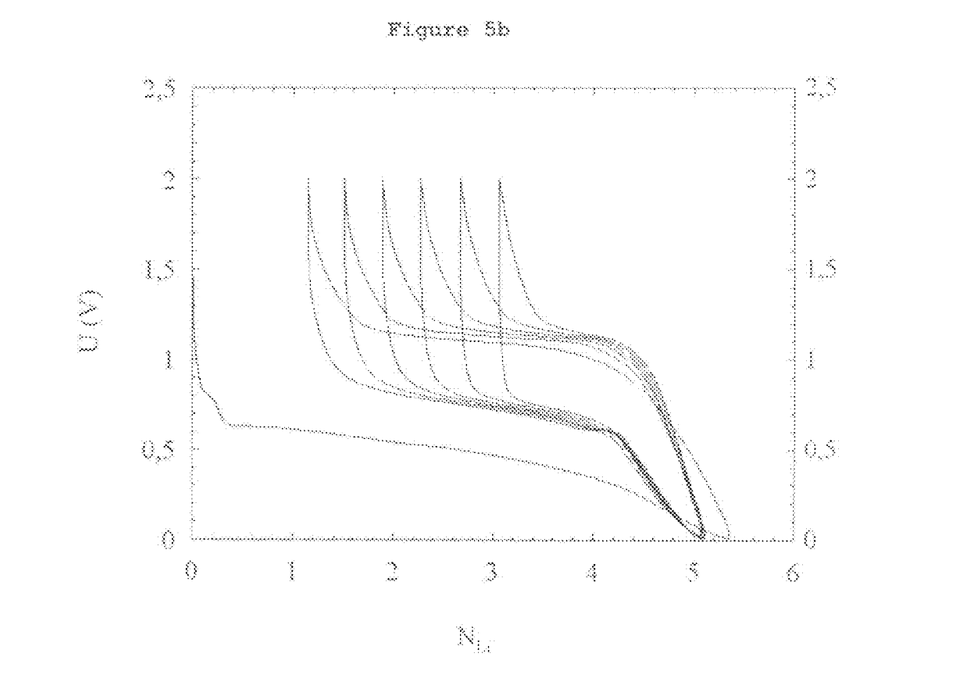
Figure 5C:
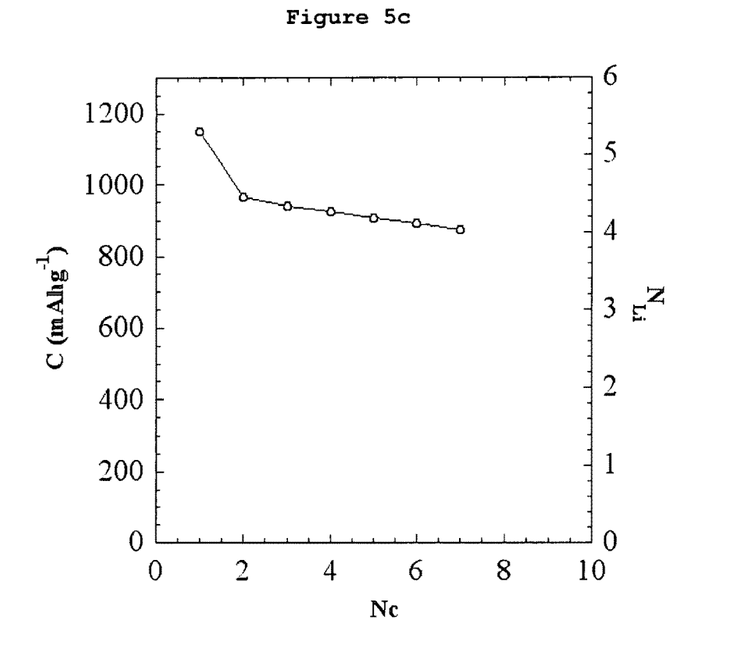
Figure 5D:
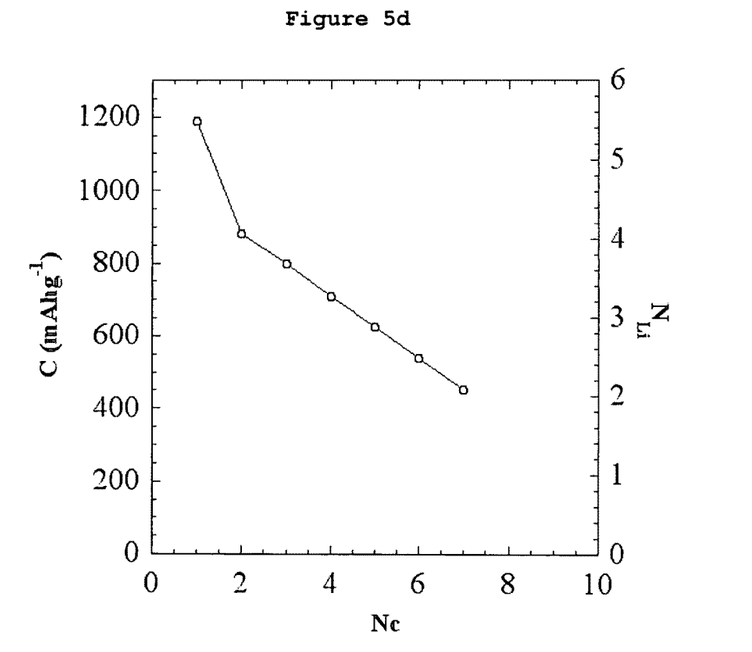

FIGS. 5a to 5d make it possible to compare the performances between an electrode according to the invention consisting of $NiP_2$ on a nickel foam (FIGS. 5a and 5c) and a $NiP_2$ phase in powder form produced by mechanosynthesis (FIGS. 5b and 5d). The electrode according to the invention was obtained according to the procedure from Example 2, the reaction between the foam and the phosphorus being carried out at a temperature of 350° C. for 12 hours. The mechanosynthesis technique is described in the publication by M. Morcrette et al., Electrochem. Solid State Lett., 6, 4 (2003).

Curves 5a and 5b represent the potential U, in volts, as a function of the number of Li$^+$ ions inserted ($N_{Li}$), and curves 5c and 5d represent the capacity C and the number of Li$^+$ ions inserted ($N_{Li}$) as a function of the number of cycles ($N_c$). The rate of insertion is 1 Li$^+$ ion in 10 hours. The curves obtained for the electrode according to the invention show that 5.2 Li$^+$ ions are inserted during discharge with respect to lithium, and 4.5 Li$^+$ ions are extracted during the first charge. The capacity resulting from this first discharge is 1150 mA.h.g$^{-1}$, and 1000 mA·h·g$^{-1}$ during charging, i.e. a volume capacity of 5600 and 4900 mA·h·cm$^{-3}$ respectively. After 7 cycles, the capacity is still 900 mA·h·g$^{-1}$. After 6 cycles, the capacity is only 444 mA·h·g$^{-1}$ from the sample produced by mechanosynthesis.

Thus, it appears that after 7 cycles, the capacity measured for the $NiP_2$ phase produced by mechanosynthesis is only 15% of that of the first discharge, and 20% of that of the second, whereas the electrode according to the invention maintains 72% of the capacity of the first discharge and more than 85% of that of the second.

The cycling performance is therefore substantially improved for the electrode according to the invention, relative to the material produced by mechanosynthesis. These results are all the more significant as the electrode materials produced by mechanosynthesis are themselves recognized as showing superior electrochemical performance than that of materials obtained by the conventional ceramic route.

EXAMPLE 5

The impregnation of a copper foam by copper phosphide was carried out in the device described above starting from a copper foam (sold by Efoam) the thickness of which was around 1.5 mm, and the width of which was around 150 mm. The pores represented around 90% of the total volume of the foam. The foam had a strength of 1000 N/m.

The reaction was carried out at a temperature of 350° C. for 15 hours, using an amount of phosphorus corresponding to the stoichiometry of the $CuP_2$ compound.

The X-ray diffraction pattern obtained for the material composed of the impregnated foam is represented in FIG. 6 (Cr wavelength). The pattern makes it possible to observe the crystalline phase $Cu_3P$ (a=6.951 (1) Å; c=7.143 (1) Å, in the space group $P6_3cm$), the $CuP_2$ phase being amorphous to X-rays.

The galvanostatic measurement corresponding to this sample appears in FIG. 7a, which represents the potential U, in volts, as a function of the number of $Li^+$ ions inserted ($N_{Li}$). The results obtained are representative of the insertion of lithium into a phase formed of copper diphosphide $CuP_2$. The comparison of these results with a galvanostatic measurement carried out on a $Cu_3P$ powder produced by the ceramic route at 600° C. (FIG. 7b) reveals the good cyclability of the battery produced from the copper foam.

EXAMPLE 6

The procedure from Example 1 was repeated, but using an amount of phosphorus corresponding to the stoichiometry of the nickel triphosphide $NiP_3$ compound.

The X-ray diffraction pattern is represented in FIG. 8a. It shows that the product formed is a triphosphide $NiP_3$ which has a cubic structure (Im3) with a lattice parameter a=7.819 Å.

FIG. 8b shows the electrochemical behavior of the Ni foam impregnated by the nickel triphosphide. The potential V (Vs $Li^+/Li$) is plotted on the y-axis, and the number x of $Li^+$ ions inserted in the $Li_xNiP_3$ compound is plotted on the x-axis. The rate of insertion is 1 $Li^+$ ion in 10 hours. It appears that 6 $Li^+$ ions are inserted during discharge down to 0 V with respect to lithium, and that 5.4 $Li^+$ ions are extracted up to 2 V during the first charge. The reversible capacity which results therefrom is consequently 960 mA·h·g$^{-1}$, which represents three times the capacity of a graphite electrode.

The invention claimed is:

1. A method for producing an anode for a lithium-ion battery, said anode comprising a current collector formed from a transition metal M in the form of a foam and an active material comprising a phosphide of said metal M, said active material corresponding to the formula $MP_x$ in which $1 \leq x \leq 4$, wherein the method comprises subjecting the metal M foam to the action of phosphorus vapor at a temperature between 300° C. and 600° C., the phosphorus being present in a proportion which differs by at most 10% from the stoichiometric proportion relative to the metal M.

2. The method as claimed in claim 1, wherein the active material corresponds to the formula $MP_2$.

3. The method as claimed in claim 1 or 2, wherein the reaction between the metal foam and the phosphorus is carried out for a duration between 6 and 120 hours.

4. The method as claimed in claim 1, wherein the reaction between the metal foam and the phosphorus takes place under vacuum.

5. The method as claimed in claim 1, wherein the reaction between the metal foam and the phosphorus takes place under an inert gas.

6. The method as claimed in claim 1, wherein the transition metal M is nickel.

7. The method as claimed in claim 1, wherein the transition metal M is copper.

8. The method as claimed in claim 1, wherein the transition metal M is vanadium.

9. The method as claimed in claim 1, wherein the transition metal M is titanium.

10. The method as claimed in claim 1, wherein the transition metal M is iron.

11. An anode for a lithium-ion battery, comprising a current collector and an active material, wherein the current collector comprises a transition metal M foam, a binary phosphide of the metal M corresponding to the formula $MP_x$, in which $1 \leq x \leq 4$, wherein the phosphide is formed by a reaction of phosphorus vapor with the foam, thereby forming a chemical interface between the phosphide and the foam.

12. The anode as claimed in claim 11, wherein the phosphide of the metal M corresponds to the formula $MP_2$.

13. The anode as claimed in claim 11, wherein the current collector is a nickel foam.

14. The anode as claimed in claim 11, wherein the current collector is a copper foam.

15. The anode as claimed in claim 11, wherein the current collector is a vanadium foam.

16. The anode as claimed in claim 11, wherein the current collector is a titanium foam.

17. The anode as claimed in claim 11, wherein the current collector is an iron foam.

18. A lithium-ion battery comprising an anode as claimed in claim 11, a cathode comprising a lithium-containing material as an active material, and an electrolyte consisting of a lithium salt and a solvent or a mixture of solvents.

* * * * *